May 12, 1942.   F. MEYER   2,282,978

CONVEYER SYSTEM FOR UNLOADING SHIPS

Filed Jan. 25, 1940

Inventor:
Fritz Meyer.
By Sommers & Young
Attys

Patented May 12, 1942

2,282,978

UNITED STATES PATENT OFFICE 2,282,978

CONVEYER SYSTEM FOR UNLOADING SHIPS

Fritz Meyer, Uzwil, Switzerland, assignor to the firm Bühler Brothers, Uzwil, Switzerland Application January 25, 1940, Serial No. 315,614
In Germany February 6, 1939

7 Claims. (Cl. 214—13)

This invention relates to conveyer systems for unloading loose material from ships. There are already known conveyer systems comprising a combination of a bucket elevator and of a pneumatic conveyer. In such systems the elevator must accomplish the principal share of the unloading work, while the pneumatic conveyer is particularly used to carry away the loose material from such portions of the hold which cannot be reached with the rigid elevator. But in such cases where a large hauling output is required, for example 100 to 150 tons per hour or more, the elevator cannot be made sufficiently powerful, because it would become too big and cumbersome; it is therefore necessary to provide a more powerful pneumatic conveyer to obtain the required hauling output for the system, but pneumatic conveyers for high output are expensive and need much power.

It is an object of the invention to provide a conveyer system for unloading loose material from ships having a conveying capacity of at least 100 tons per hour and which avoids the above mentioned drawbacks.

Further objects and advantages of the present invention will be apparent from the following description in connection with the accompanying drawing, given merely by way of example and in which—

Figure 1:
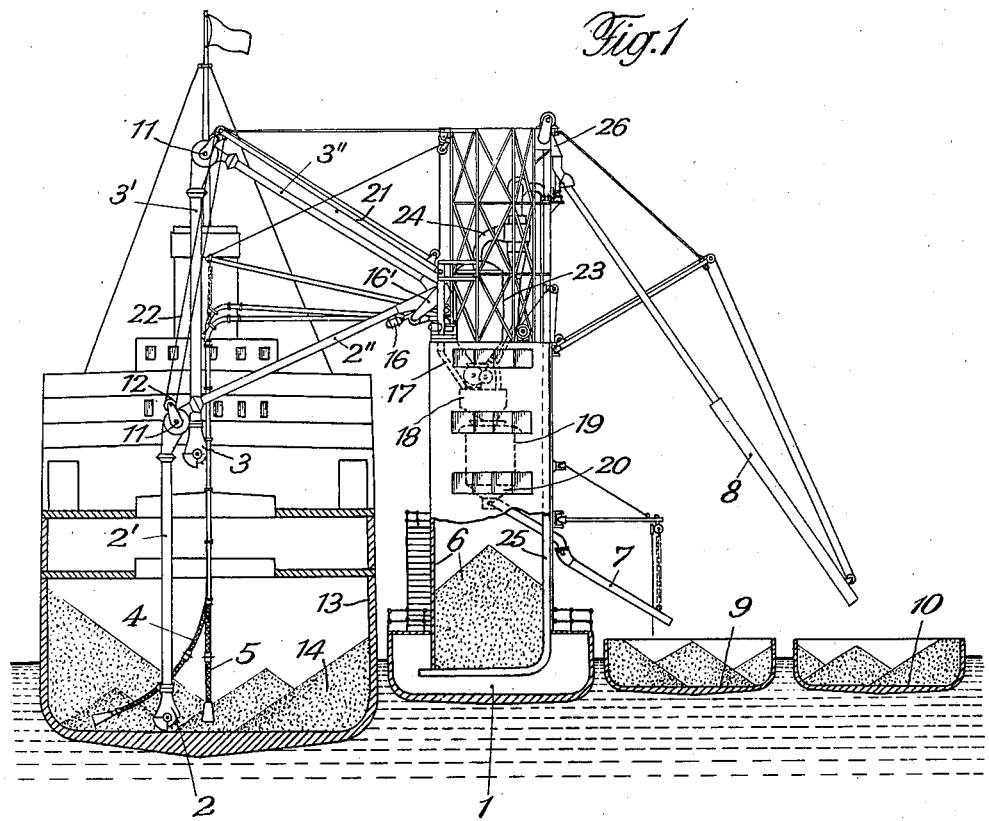
Fig. 1 represents a conveyer system according to the invention in operating position for unloading loose material from a ship.
Figure 2:
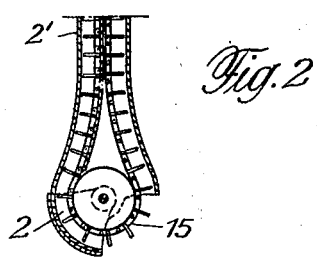
Fig. 2 is a fractionary sectional view of one of the conveyers.

The represented conveyer system is mounted on a lighter 1 and comprises two chain conveyers 2 and 3, and two pneumatic conveyers 4 and 5. The chain conveyers comprise each two hingedly connected trough sections 2′, 2″ and 3′, 3″ respectively. The hinge connections 11 allow for vertical adjustment of the intake ends of the chain conveyers. These latter are suspended on hoists 21 by means of cables 22 passing over pulleys 12 carried by the conveyers. The conveyer 2 is shown in working position, while the conveyer 3 is in raised position from which it may be swung back towards the lighter or lowered into the hold 13 of the ship containing the loose material 14.

The chain conveyers comprise each a conveyer chain 15 which is common to both trough sections 2′, 2″ or 3′, 3″, respectively. The conveyer 2 comprises a motor 16 and driving connections 16′ for imparting movement to the chain 15. The material hauled by the chain 15 of the conveyer 2 falls from the discharge end of the conveyer through a chute 17 into a container 18 and then arrives on a weighing device 19 which discharges in a container 20. From there an adjustably mounted transfer and discharge pipe or chute 7 delivers the material on a barge 9.

The pneumatic conveyers 4 and 5 comprise flexible conveyer tube sections permitting bending of the tubes so as to reach beneath floors and into the corners of the hold which is to be unloaded. The chain conveyers, however, have a conveying capacity which is a multiple of that of the pneumatic conveyer and they perform the greater portion of the conveying work. The material which is hauled by the pneumatic conveyers 4 and 5 arrives in a receptacle 23 wherefrom the air is exhausted through pipe 24, while the conveyed material also falls down through container 18, weighing device 19 and container 20 to the outlet pipe 7.

The lighter 1 is provided with a bunker 6 the storage capacity of which corresponds at least to a hauling output of the four conveyers during two minutes operating time. The purpose of this bunker is to receive the hauled material during the time a filled barge 9 underneath the transfer chute 7 is exchanged against an empty one. In this manner the operation of the conveyers does not require to be interrupted during an exchange of barges; only the communication between the chute 7 and the bunker 20 is cut, while this latter is allowed to deliver into the bunker 6. The material which accumulates in the bunker 6 is discharged by means of a chain conveyer 25 which delivers at 26 into a discharge chute 8, having its outlet end placed above a barge 10.

The described conveyer system presents the advantage that the chain conveyers will not be too heavy and too expensive, even for high outputs, in comparison with a bucket elevator. Moreover, a chain conveyer requires a fraction only of the driving power necessary for a pneumatic conveyer having the same hauling output. Accordingly, the combination of a chain conveyer and a pneumatic conveyer results in a system having a great hauling output at relatively low initial and operating costs.

Instead of being placed on a lighter 1, the described unloading apparatus could also be stationary.

Although I have shown and described a particular embodiment of my improved conveyer system for unloading ships, I do not desire to limit my invention to the particular arrangements disclosed, and I intend in the appended claims to cover all modifications which do not depart from the spirit and scope of the invention.

I claim:

1. A conveying system for unloading loose material from ships, comprising in combination at least one pneumatic conveyer for hauling loose material from the hold of a ship, a transfer and discharge chute for receiving the material delivered by the conveyer, a bunker for communicating with the delivery end of the conveyer for receiving the material hauled by the conveyer upon said chute being out of operation, said bunker having a storage capacity corresponding to a hauling output of the conveyer of at least two minutes operating time.

2. A conveyer system for unloading loose material from ships, comprising in combination, a conveyer for hauling loose material from the hold of a ship, a container communicating with the delivery end of said conveyer for collecting the material delivered by the conveyer, a transfer and discharge chute communicating with the container, and a bunker for temporarily communicating with the container to collect the material delivered by the conveyer upon said chute being out of operation.

3. A conveyer system for unloading loose material from ships, comprising in combination, a conveyer for hauling loose material from the hold of a ship, a receiving device communicating with the delivery end of said conveyer for collecting the material delivered by the conveyer, a transfer and discharge chute communicating with the container, and a bunker disposed beneath said receiving device and for temporarily communicating therewith to collect the material delivered by the conveyer upon said chute being out of operation, said bunker having a storage capacity corresponding to a hauling output of the conveyer of at least two minutes operating time.

4. A floating conveyer system for unloading loose material from ships, comprising in combination, a supporting frame, a plurality of conveyers mounted on the frame and adapted to be simultaneously lowered in the hold of a ship to be unloaded, a common receiving container for the material delivered by said conveyers, a transfer and discharge chute communicating with said receiving container for discharging the hauled material, a bunker located beneath said receiving container for collecting the material from said receiving container when the transfer and discharge chute is temporarily inoperative, said bunker having a storage capacity corresponding to a hauling output of said conveyers of at least two minutes operating time, and conveying means for elevating and discharging the material collected in said bunker.

5. A conveyer system mounted on a lighter for unloading loose material from ships, comprising in combination, a supporting frame, a plurality of conveyers mounted on the frame for hauling material from the hold of the ship, receiving devices collecting the material delivered by the conveyers, a transfer and discharge chute communicating with said receiving devices to carry the material off the lighter by gravity, a bunker disposed beneath said receiving devices for temporarily communicating therewith to collect the material delivered by said conveyers upon said chute being inoperative, and conveying means for elevating and discharging the material temporarily collecting in said bunker.

6. A conveyer system for unloading loose material from ships, comprising in combination, a chain conveyer for hauling loose material from the hold of a ship, a receiving device communicating with the discharge end of said conveyer for collecting the material delivered by the conveyer, a pneumatic conveyer for hauling material from said hold of the ship, an air separator connected to the delivery end of said pneumatic conveyer and communicating with said receiving device, a transfer and discharge chute communicating with the receiving device for discharging therefrom the material hauled by said chain conveyer and said pneumatic conveyer, and a bunker disposed beneath said receiving device for collecting the material from said receiving device when said transfer and discharge chute is temporarily inoperative.

7. A floating conveyer system for unloading loose material from ships, comprising in combination, a supporting frame, a chain conveyer mounted on the frame for hauling loose material from the hold of a ship, receiving devices communicating with the discharge end of said conveyer for collecting the material delivered by the conveyer, a pneumatic conveyer for hauling material from said hold of the ship, an air separator connected to the delivery end of said pneumatic conveyer, said air separator being placed above said receiving devices and communicating therewith for discharging the hauled material into said devices, a transfer and discharge chute communicating with the receiving devices for discharging the material hauled by said chain conveyer and said pneumatic conveyer, and a bunker disposed beneath said receiving devices for collecting the material from said receiving devices when the transfer and discharge chute is temporarily inoperative, said bunker having a storage capacity corresponding to a hauling output of said conveyers of at least two minutes operating time.

FRITZ MEYER.